(12) United States Patent
Lu et al.

(10) Patent No.: US 11,895,750 B2
(45) Date of Patent: Feb. 6, 2024

(54) HIGH-EFFICIENCY LIGHT-EMITTING DIODE DRIVING CIRCUIT AND HIGH-EFFICIENCY LIGHT-EMITTING DIODE LIGHTING DEVICE

(71) Applicant: Xiamen PVTECH Co., Ltd., Fujian (CN)

(72) Inventors: Fuxing Lu, Fujian (CN); Zhirong Lin, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/956,791

(22) Filed: Sep. 29, 2022

(65) Prior Publication Data

US 2023/0337345 A1   Oct. 19, 2023

(30) Foreign Application Priority Data

Apr. 15, 2022   (CN) .......................... 202210397073.3

(51) Int. Cl.
*H05B 45/30* (2020.01)
*H05B 45/395* (2020.01)
*H05B 45/36* (2020.01)

(52) U.S. Cl.
CPC ........... *H05B 45/395* (2020.01); *H05B 45/36* (2020.01)

(58) Field of Classification Search
CPC ...... H05B 45/10; H05B 45/48; H05B 45/325; H05B 45/345; H05B 45/375; H05B 45/385; H05B 45/395
See application file for complete search history.

(56) References Cited

U.S. PATENT DOCUMENTS

| | | | |
|---|---|---|---|
| 9,288,850 B2* | 3/2016 | Yu | H05B 45/395 |
| 10,716,184 B1* | 7/2020 | Pu | H03K 5/24 |
| 2012/0249001 A1* | 10/2012 | Okubo | H05B 45/3725 |
| | | | 315/200 R |
| 2014/0077712 A1* | 3/2014 | Cheng | H05B 45/44 |
| | | | 315/193 |
| 2014/0333215 A1* | 11/2014 | Chiu | H05B 45/48 |
| | | | 315/185 R |
| 2015/0097489 A1* | 4/2015 | Wu | H05B 45/28 |
| | | | 315/122 |
| 2015/0359052 A1* | 12/2015 | van den Broeke | H05B 45/10 |
| | | | 315/307 |
| 2016/0270162 A1* | 9/2016 | Gulsen | H05B 45/395 |
| 2016/0374170 A1* | 12/2016 | Lee | H05B 45/44 |
| 2017/0006684 A1* | 1/2017 | Tu | H05B 45/20 |
| 2018/0069483 A1* | 3/2018 | Akiyama | H01L 33/00 |
| 2019/0032864 A1* | 1/2019 | Xiong | F21V 23/005 |

* cited by examiner

Primary Examiner — Tung X Le
(74) Attorney, Agent, or Firm — Winston Hsu

(57) ABSTRACT

A high-efficiency LED driving circuit includes a rectifying module, a power converting module and a power supply module. The power converting module is connected to the rectifying module and a load, and includes a controller. The load includes a plurality of LEDs. The power input pin of the controller is connected to a connecting point and the connecting point is disposed between two of the LEDs. The quantity of the LEDs can be 2 or more than 2. The circuit design of the driving circuit can effectively reduce the power consumption and heat generation thereof, such that the reliability of the driving circuit can be effectively enhanced.

10 Claims, 4 Drawing Sheets

HIGH-EFFICIENCY LIGHT-EMITTING DIODE DRIVING CIRCUIT AND HIGH-EFFICIENCY LIGHT-EMITTING DIODE LIGHTING DEVICE

BACKGROUND OF THE INVENTION

1. Field of the Invention

The present invention relates to a light-emitting diode (LED) driving circuit, in particular to a high-efficiency LED driving circuit. The present invention further relates to an LED lighting device having the driving circuit.

2. Description of the Prior Art

In order to achieve the goals of "carbon peak" and "carbon neutrality", lighting devices manufacturers keep improving the performances of lighting devices. Light-emitting diodes (LED) have many advantages, such as high efficiency, energy saving, and long service life. However, due to the limitation of the driving circuits for LEDs, the power consumption and efficiency of LEDs cannot be further improved. Therefore, how to effectively improve the driving circuits for LEDs to reduce the power consumption and improve the efficiency of LEDs has become an important issue.

SUMMARY OF THE INVENTION

One embodiment of the present invention provides a high-efficiency light-emitting diode (LED) driving circuit, which includes a rectifying module, a power converting module and a power supplying module. The power converting module is connected to the rectifying module and a load; the power converting module includes a controller. The load includes a plurality of LEDs. The power source input pin of the controller is connected to a connecting point via the power supplying module and the connecting point is disposed between two of the LEDs.

In one embodiment, the high-efficiency LED driving circuit further includes a rectifying module. The rectifying module is connected to the power converting module via the filtering module.

In one embodiment, the filtering module is an electromagnetic compatibility (EMC) circuit.

In one embodiment, the rectifying module is connected to a power source.

In one embodiment, the quantity of the LEDs is 2 or more than 2.

Another embodiment of the present invention provides a high-efficiency LED lighting device, which includes a rectifying module, a power converting module, a load and a power supplying module. The power converting module is connected to the rectifying module and includes a controller. The load is connected to the power converting module and includes a plurality of LEDs. The power source input pin of the controller is connected to a connecting point via the power supplying module and the connecting point is disposed between two of the LEDs.

In one embodiment, the high-efficiency LED lighting device further includes a rectifying module. The rectifying module is connected to the power converting module via the filtering module.

In one embodiment, the filtering module is an EMC circuit.

In one embodiment, the rectifying module is connected to a power source.

In one embodiment, the quantity of the LEDs is 2 or more than 2.

The high-efficiency LED driving circuit and the high-efficiency LED lighting device in accordance with the embodiments of the present invention may have the following advantages:

(1) In one embodiment of the present invention, the LED driving circuit has a power converting module and the power input pin of the controller of the power converting module is connected to a connecting point between two of the LEDs of a load via a power supplying module. In this way, when the driving current reaches the load, the driving current of the LED driving circuit can drive a part of the LEDs of the load first, and generate a first branch current and a second branch current. The first branch current drives the other part of the LEDs and the second branch current drives the controller after passing through a power supplying module and the power input pin of the controller. Thus, the LED driving circuit and the load can normally operate. Besides, the LED driving circuit can effectively reduce the power consumption of the load and enhance the operating efficiency of the load.

(2) In one embodiment of the present invention, a part of the LEDs of the load of the LED driving circuit can be driven by the driving current and the other part of the LEDs of the load can be driven by the first branch current of the driving current. In this way, the voltages applied to the power supplying pins of the LEDs can be decreased, which can prevent the power source input pin of the controller from being penetrated through by high voltage with an aim of enhancing the reliability of the controller.

(3) In one embodiment of the present invention, the controller of the LED driving circuit can be driven by the second branch current of the driving current, so the voltage applied to the power source input pin of the controller can be reduced. Accordingly, the heat generation of the controller can be effectively decreased and the internal loss of the controller can be also reduced. Thus, the controller can normally operate and the reliability thereof can be further enhanced.

(4) In one embodiment of the present invention, the circuit design of the LED driving circuit can effectively reduce the power consumption of the load and improve the operating efficiency of the load. Therefore, the performance of the load can be further improved, so the LED driving circuit can satisfy the actual requirements and achieve the target of energy saving.

(5) In one embodiment of the present invention, the LED driving circuit not only can be applied to LED lamp tubes, but also can be applied to LED bulbs or other LED lighting devices. Thus, the LED driving circuit can be more comprehensive in application and flexible in use.

(6) In one embodiment of the present invention, the circuit design of the LED driving circuit is simple, so the LED driving circuit can achieve the desired technical effect without significantly increasing the cost thereof. Accordingly, the LED driving circuit can have high commercial value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
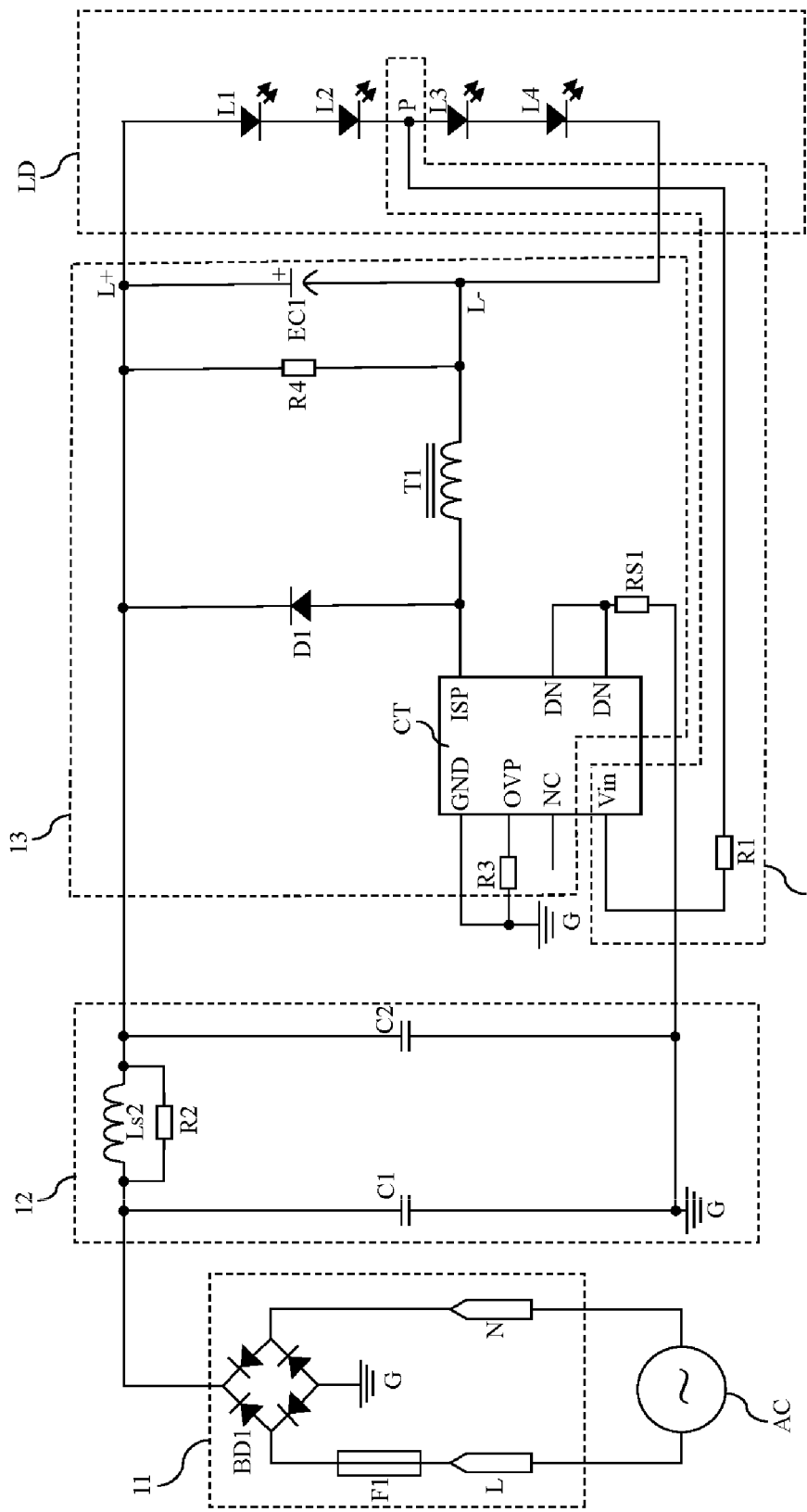
FIG. 1 is a circuit diagram of a high-efficiency light-emitting diode (LED) driving circuit in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a circuit diagram of a high-efficiency light-emitting diode (LED) driving circuit in accordance with one embodiment of the present invention. As shown in FIG. 1, the LED driving circuit 1 includes a rectifying module 11, a filtering module 12, a power converting module 13 and a power supplying module 14.

The rectifying module 11 is connected to a power source AC. In the embodiment, the rectifying module 11 may include a live wire input terminal L, a neutral wire input terminal N, a fuse F1 and a bridge rectifier BD1 (G stands for the ground). The above circuit is just for illustration instead of limitation; the circuit design of the rectifying module 11 can be changed according to actual requirements.

The filtering module 12 is connected to the rectifying module 11. In this embodiment, the filtering module 12 may be an electromagnetic compatibility (EMC) circuit, which includes capacitors C1-C2, a resistor R1 and an inductor Ls2. The above circuit is just for illustration instead of limitation; the circuit design of the filtering module 12 can be changed according to actual requirements.

The power converting module 13 is connected to the filtering module 12 and the load LD. the rectifying module 11 is connected to the power converting module 13 via the filtering module 12. In this embodiment, the power converting module 14 may include a controller CT, resistors R3-R4, a resistor RS1, a diode D1, a capacitor EC1, an inductor T1, a first output terminal L+ and a second output terminal L−.

The above circuit is just for illustration instead of limitation; the circuit design of the power converting module 13 can be changed according to actual requirements. The controller CT may include a power source input pin Vin, a NC pin, an OVP pin, a GND pin, an ISP pin and DN (DRAIN) pins. The circuit structure and the functions of the controller CT should be known by those skilled in the art, so will not be described herein.

The load LD includes 4 LEDs L1-L4. The quantity of the LEDs L1-L4 can be adjusted according to actual requirements. In another embodiment, the quantity of the LEDs of the load LD may be 2 or more than 2.

In this embodiment, the power supplying module 14 may include a resistor R1. The above circuit is just for illustration instead of limitation; the circuit design of the power supplying module 14 can be changed according to actual requirements. The power source input pin Vin of the controller CT is connected to a connecting point P via the power supplying module 14. The connecting point P is disposed between two of the LEDs L1-L4 of the load LD. In this embodiment, the connecting point P is disposed between the LED L2 and the LED L3 of the loads LD. The position of the connecting point P can be adjusted according to the requirements of different circuit designs.

The embodiment just exemplifies the present invention and is not intended to limit the scope of the present invention; any equivalent modification and variation according to the spirit of the present invention is to be also included within the scope of the following claims and their equivalents.

Figure 2:
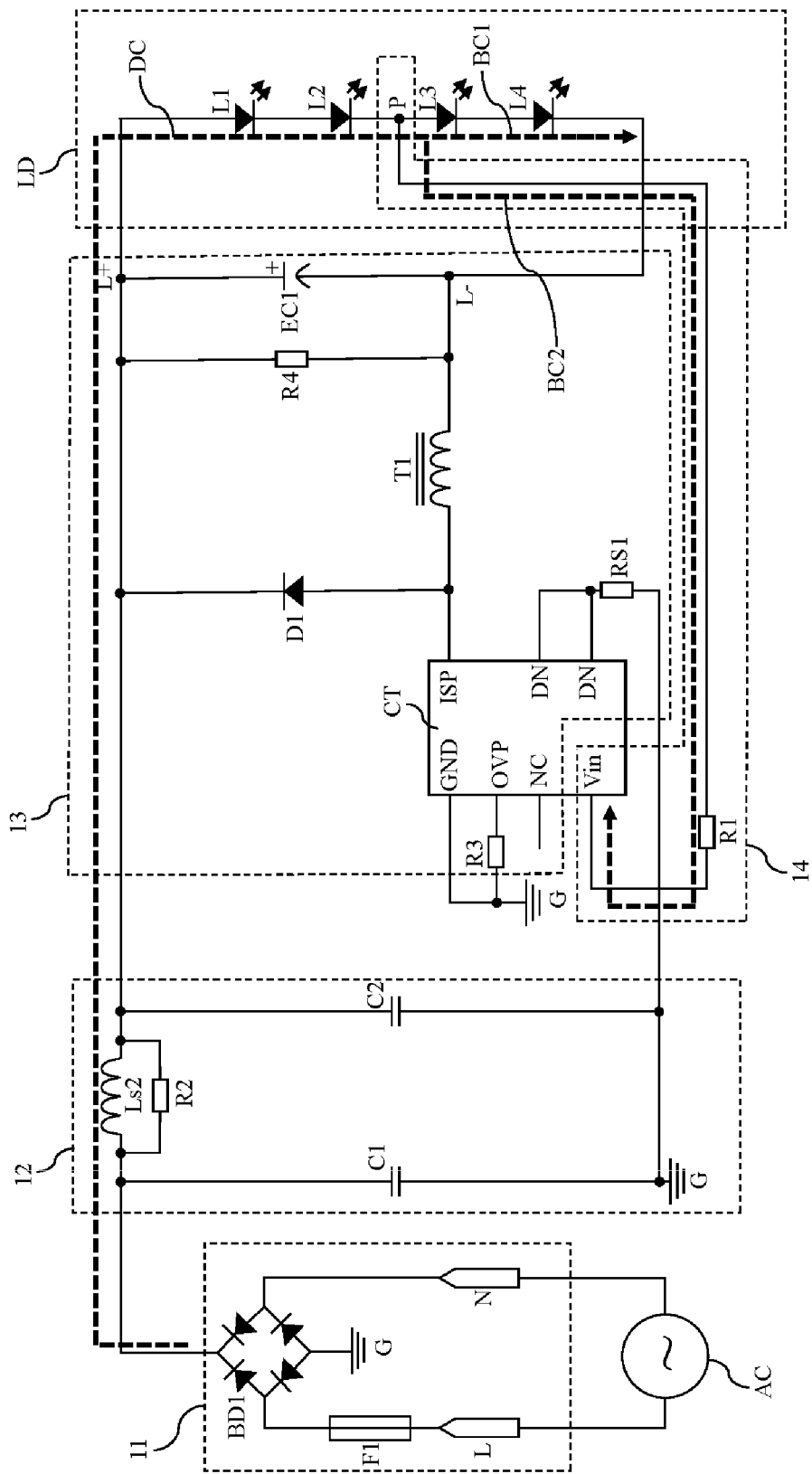
FIG. 2 is a schematic view of an operation status of the high-efficiency LED driving circuit in accordance with one embodiment of the present invention.

Please refer to FIG. 2, which is a schematic view of an operation status of the high-efficiency LED driving circuit in accordance with one embodiment of the present invention. As shown in FIG. 2, the rectifying module 11 can rectify the alternating current outputted by the power source AC to generate a driving current (direct current) DC. The driving current DC is filtered by the filtering module 12 and then outputted to the load LD.

When the driving current DC reaches the load LD, the LEDs L1-L2 of the load LD are driven by the driving current DC. Then, the driving current DC is divided into a first branch current BC1 and a second branch current BC2 when the driving current DC reaches the connecting point P. Afterward, the first branch current BC1 drives the LEDs L3-L4 of the load LD, and the second branch current BC2 drives the controller CT via the power supplying module 14 and the power source input pin Vin of the controller CT.

As described above, the LED driving circuit 1 has the power converting module 13 and the power source input pin Vin of the controller CT of the power converting module 13 is connected to the connecting point P between two of the LEDs L1-L4 of the load LD. In this way, the driving current DC of the LED driving circuit 1 can drive a part of the LEDs L1-L4 of the load LD first and be divided into the first branch current BC1 and the second branch current BC2 when the driving current DC reaches the load LD. Then, the first branch current BC1 drives the LEDs L3-L4 (the other part) of the load LD and the second branch current BC2 drives the controller CT via the power supplying module 14 and the power source input pin Vin of the controller CT. Therefore, the LED driving circuit 1 and the load LD can normally operate. In addition, the LED driving circuit 1 can effectively reduce the power consumption of the load LD and further improve the operating efficiency of the load LD.

Further, via the above mechanism, the voltages applied to the power supplying pins of the LEDs L1-L4 can be decreased, which can prevent the power source input pin Vin of the controller CT from being penetrated through by high voltage with a view to greatly enhance the reliability of the controller CT.

Moreover, the controller CT can be driven by the second branch current BC2 of the driving current DC, so the voltage applied to the power source input pin Vin of the controller CT can be decreased. Accordingly, the heat generation of the controller CT can be effectively decreased and the internal loss of the controller CT can be also reduced, which can further enhance the reliability of the controller CT.

The embodiment just exemplifies the present invention and is not intended to limit the scope of the present invention; any equivalent modification and variation according to the spirit of the present invention is to be also included within the scope of the following claims and their equivalents.

It is worthy to point out that the power consumption and efficiency of currently available LEDs cannot be further improved because of the limitation of the driving circuits thereof. On the contrary, according to one embodiment of the present invention, the LED driving circuit has a power converting module and the power input pin of the controller of the power converting module is connected to a connecting point between two of the LEDs of a load via a power supplying module. In this way, when the driving current reaches the load, the driving current of the LED driving circuit can drive a part of the LEDs of the load first, and generate a first branch current and a second branch current. The first branch current drives the other part of the LEDs and the second branch current drives the controller after passing through a power supplying module and the power input pin of the controller. Thus, the LED driving circuit and the load can normally operate. Besides, the LED driving circuit can effectively reduce the power consumption of the load and enhance the operating efficiency of the load.

According to one embodiment of the present invention, a part of the LEDs of the load of the LED driving circuit can be driven by the driving current and the other part of the LEDs of the load can be driven by the first branch current of the driving current. In this way, the voltages applied to the power supplying pins of the LEDs can be decreased, which can prevent the power source input pin of the controller from being penetrated through by high voltage with an aim of enhancing the reliability of the controller.

Also, according to one embodiment of the present invention, the controller of the LED driving circuit can be driven by the second branch current of the driving current, so the voltage applied to the power source input pin of the controller can be reduced. Accordingly, the heat generation of the controller can be effectively decreased and the internal loss of the controller can be also reduced. Thus, the controller can normally operate and the reliability thereof can be further enhanced.

Further, according to one embodiment of the present invention, the circuit design of the LED driving circuit can effectively reduce the power consumption of the load and improve the operating efficiency of the load. Therefore, the performance of the load can be further improved, so the LED driving circuit can satisfy the actual requirements and achieve the target of energy saving.

Moreover, according to one embodiment of the present invention, the LED driving circuit not only can be applied to LED lamp tubes, but also can be applied to LED bulbs or other LED lighting devices. Thus, the LED driving circuit can be more comprehensive in application and flexible in use.

Furthermore, according to one embodiment of the present invention, the circuit design of the LED driving circuit is simple, so the LED driving circuit can achieve the desired technical effect without significantly increasing the cost thereof. Accordingly, the LED driving circuit can have high commercial value. As set forth above, the LED driving circuit according to the embodiments of the present invention can definitely achieve great technical effects.

Figure 3:
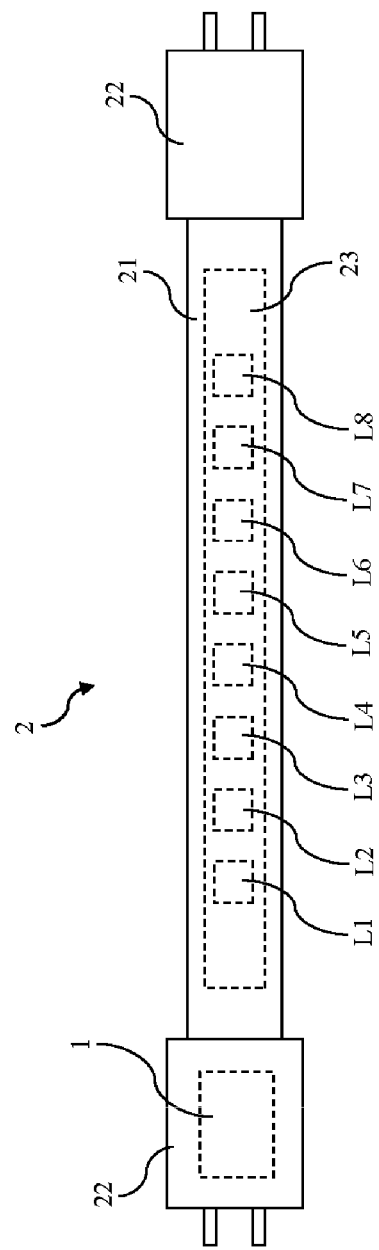
FIG. 3 is a schematic view of a high-efficiency LED lighting device in accordance with one embodiment of the present invention.

Please refer to FIG. 3, which is a schematic view of a high-efficiency LED lighting device in accordance with one embodiment of the present invention. As shown in FIG. 3, the LED lighting device 2 includes a lamp housing 21, two lamp caps 22, a lamp board 23 and a LED driving circuit 1.

The lamp caps 22 are disposed at two ends of the lamp housing 21 respectively. The lamp board 23 is disposed inside the lamp housing 21 and has a plurality of LEDs L1-L8 (the load). The LED driving circuit 1 is disposed inside one of the lamp caps 22 and connected to the lamp board 23.

The LED driving circuit 1 not only can be applied to LED lamp tubes, but also can be applied to LED bulbs or other LED lighting devices. Thus, the LED driving circuit 1 can be more comprehensive in application and flexible in use.

The embodiment just exemplifies the present invention and is not intended to limit the scope of the present invention; any equivalent modification and variation according to the spirit of the present invention is to be also included within the scope of the following claims and their equivalents.

Figure 4:
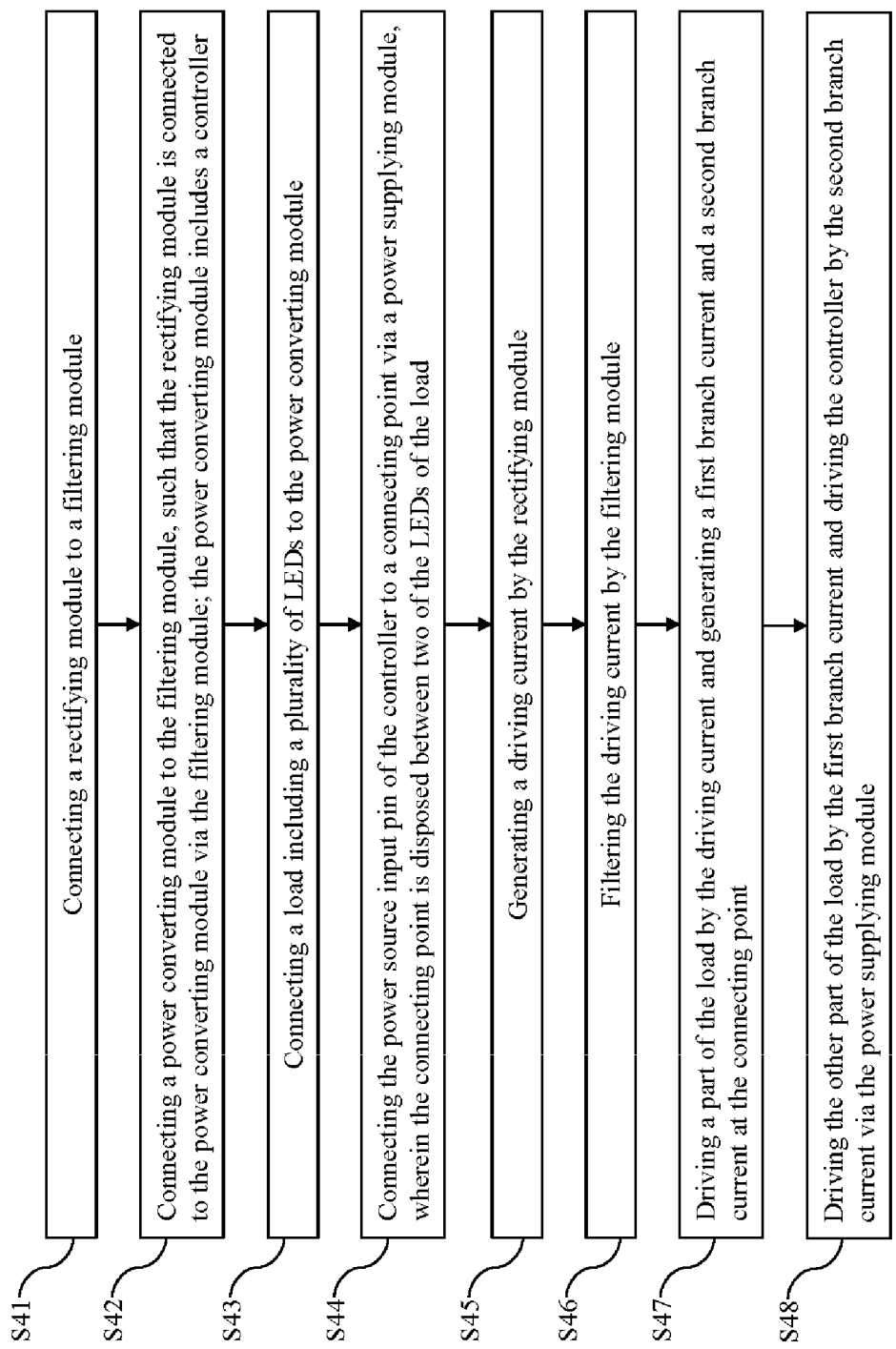
FIG. 4 is a flow chart of a LED driving method in accordance with one embodiment of the present invention.

Please refer to FIG. 4, which is a flow chart of a LED driving method in accordance with one embodiment of the present invention; please also refer to FIG. 1 and FIG. 2. The LED driving method according to this embodiment can be applied to the LED driving circuit 1 shown in FIG. 1 and FIG. 2. As shown in FIG. 4, the LED driving method according to this embodiment includes the following steps:

Step S41: connecting a rectifying module to a filtering module.

Step S42: connecting a power converting module to the filtering module, such that the rectifying module is connected to the power converting module via the filtering module; the power converting module includes a controller.

Step S43: connecting a load including a plurality of LEDs to the power converting module.

Step S44: connecting the power source input pin of the controller to a connecting point via a power supplying module, wherein the connecting point is disposed between two of the LEDs of the load.

Step S45: generating a driving current by the rectifying module.

Step S46: filtering the driving current by the filtering module.

Step S47: driving a part of the load by the driving current and generating a first branch current and a second branch current at the connecting point.

Step S48: driving the other part of the load by the first branch current and driving the controller by the second branch current via the power supplying module.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the LED driving circuit has a power converting module and the power input pin of the controller of the power converting module is connected to a connecting point between two of the LEDs of a load via a power supplying module. In this way, when the driving current reaches the load, the driving current of the LED driving circuit can drive a part of the LEDs of the load first, and generate a first branch current and a second branch current. The first branch current drives the other part of the LEDs and the second branch current drives the controller after passing through a power supplying module and the power input pin of the controller. Thus, the LED driving circuit and the load can normally operate. Besides, the LED driving circuit can effectively reduce the power consumption of the load and enhance the operating efficiency of the load.

According to one embodiment of the present invention, a part of the LEDs of the load of the LED driving circuit can be driven by the driving current and the other part of the LEDs of the load can be driven by the first branch current of the driving current. In this way, the voltages applied to the power supplying pins of the LEDs can be decreased, which can prevent the power source input pin of the controller from being penetrated through by high voltage with an aim of enhancing the reliability of the controller.

Also, according to one embodiment of the present invention, the controller of the LED driving circuit can be driven by the second branch current of the driving current, so the voltage applied to the power source input pin of the controller can be reduced. Accordingly, the heat generation of the controller can be effectively decreased and the internal loss of the controller can be also reduced. Thus, the controller can normally operate and the reliability thereof can be further enhanced.

Further, according to one embodiment of the present invention, the circuit design of the LED driving circuit can effectively reduce the power consumption of the load and improve the operating efficiency of the load. Therefore, the performance of the load can be further improved, so the LED driving circuit can satisfy the actual requirements and achieve the target of energy saving.

Moreover, according to one embodiment of the present invention, the LED driving circuit not only can be applied to LED lamp tubes, but also can be applied to LED bulbs or other LED lighting devices. Thus, the LED driving circuit can be more comprehensive in application and flexible in use.

Furthermore, according to one embodiment of the present invention, the circuit design of the LED driving circuit is simple, so the LED driving circuit can achieve the desired technical effect without significantly increasing the cost thereof. Accordingly, the LED driving circuit can have high commercial value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high-efficiency light-emitting diode (LED) driving circuit, comprising:
a rectifying module connected to a power source in order to output a driving current;
a power converting module connected to the rectifying module and a load, wherein the load comprises a plurality of LEDs and the power converting module comprises a controller; and
a power supplying module comprising a resistor;
wherein a power source input pin of the controller is connected to one end of the resistor and another end of the resistor is connected to a connecting point via the power supplying module, and the connecting point is disposed between two of the LEDs, wherein when the driving current reaches the load, a part of the LEDs are driven by the driving current, and then the driving current is divided into a first branch current and a second branch current when the driving current reaches the connecting point, wherein the first branch current drives another part of the LEDs, and the second branch current passes through the resistor in order to drive the controller via the power supplying module and the power source input pin of the controller.

2. The high-efficiency LED driving circuit as claimed in claim 1, further comprising a filtering module, wherein the rectifying module is connected to the power converting module via the filtering module.

3. The high-efficiency LED driving circuit as claimed in claim 2, wherein the filtering module is an electromagnetic compatibility circuit.

4. The high-efficiency LED driving circuit as claimed in claim 1, wherein the rectifying module is connected to a power source.

5. The high-efficiency LED driving circuit as claimed in claim 1, wherein a quantity of the LEDs is 2 or more than 2.

6. A high-efficiency LED lighting device, comprising:
a rectifying module connected to a power source in order to output a driving current;
a power converting module connected to the rectifying module and comprising a controller; and
a load connected to the power converting module and comprising a plurality of LEDs; and
a power supplying module comprising a resistor;
wherein a power source input pin of the controller is connected to one end of the resistor and another end of the resistor is connected to a connecting point via the power supplying module, and the connecting point is disposed between two of the LEDs, wherein when the driving current reaches the load, a part of the LEDs of the load are driven by the driving current, and then the driving current is divided into a first branch current and a second branch current when the driving current reaches the connecting point, wherein the first branch current drives another part of the LEDs of the load LD, and the second branch current passes through the resistor in order to drive the controller via the power supplying module and the power source input pin of the controller.

7. The high-efficiency LED lighting device as claimed in claim 6, further comprising a filtering module, wherein the rectifying module is connected to the power converting module via the filtering module.

8. The high-efficiency LED lighting device as claimed in claim 7, wherein the filtering module is an electromagnetic compatibility circuit.

9. The high-efficiency LED lighting device as claimed in claim 6, wherein the rectifying module is connected to a power source.

10. The high-efficiency LED lighting device as claimed in claim 6, wherein a quantity of the LEDs is 2 or more than 2.

* * * * *